Nov. 14, 1939.                G. L. N. MEYER                2,180,284
                                CONVEYER
                          Filed Dec. 9, 1936            3 Sheets-Sheet 1
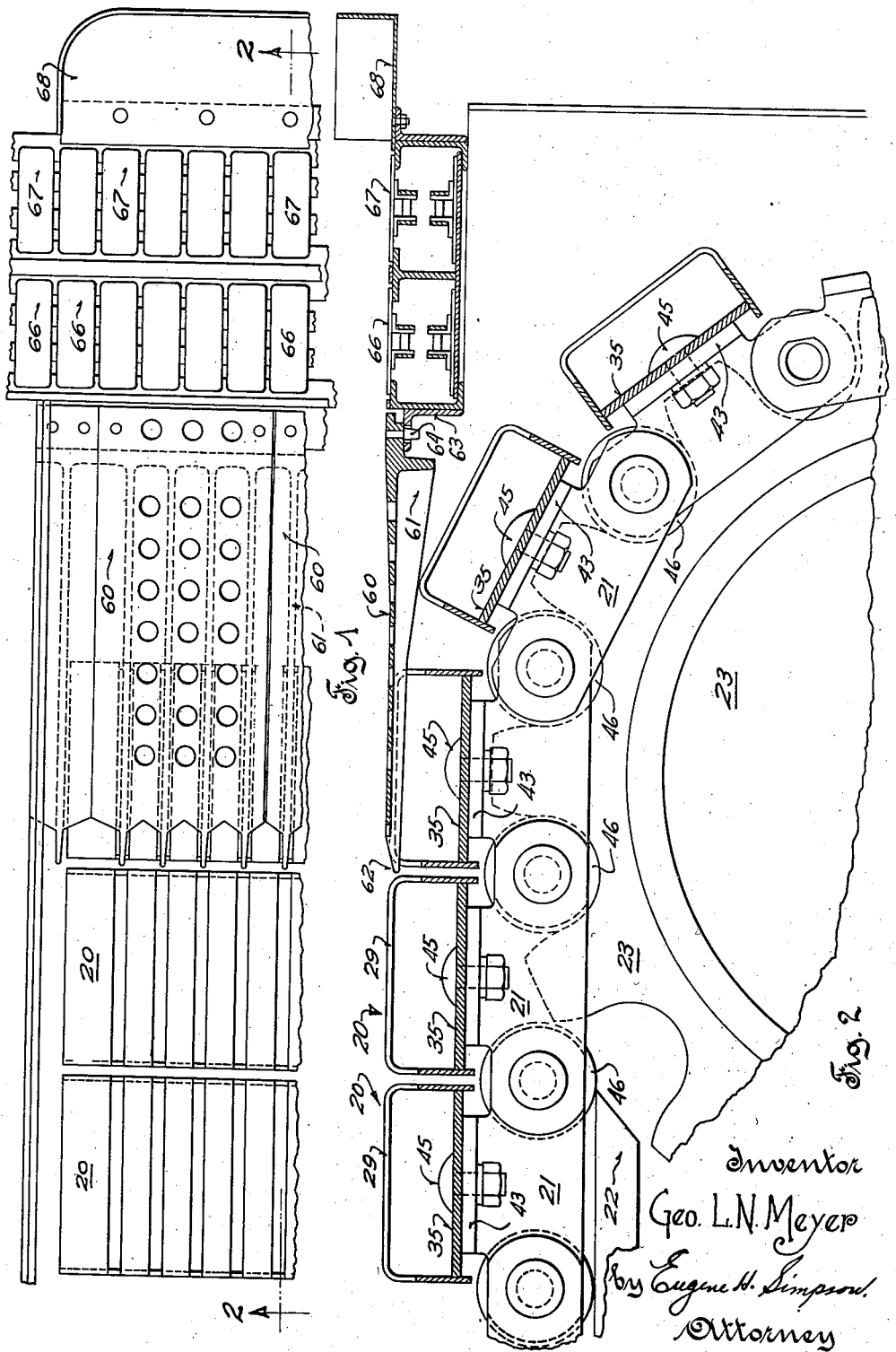

Nov. 14, 1939.   G. L. N. MEYER   2,180,284
CONVEYER
Filed Dec. 9, 1936   3 Sheets-Sheet 2
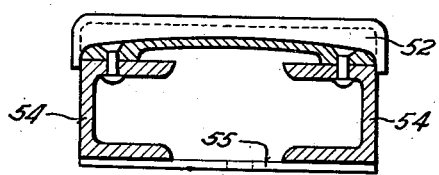
Fig. 12
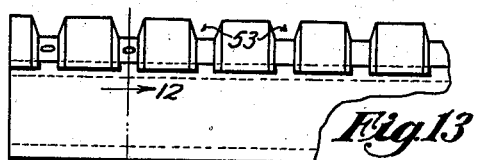
Fig. 13
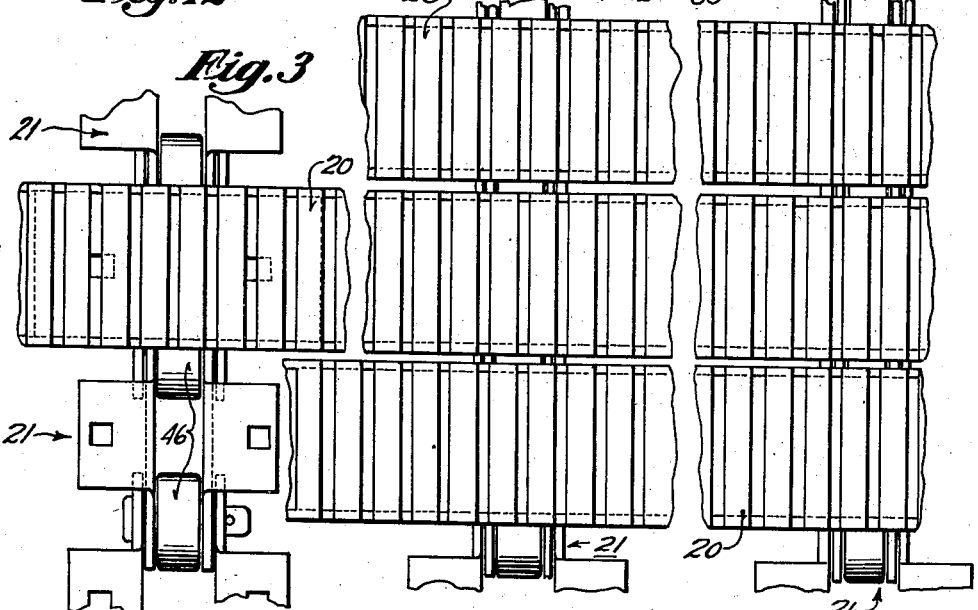
Fig. 3
Fig. 4
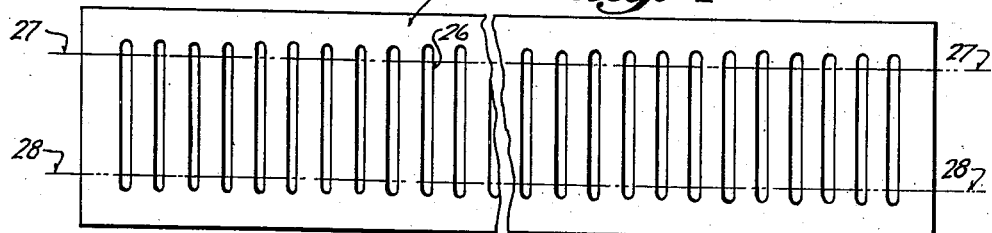
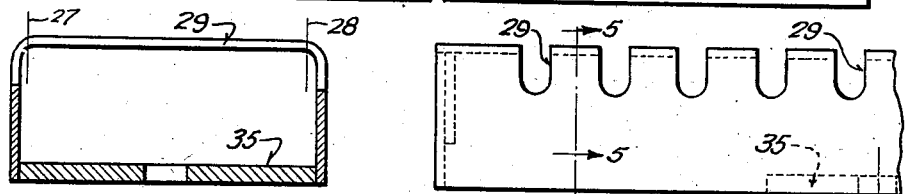
Fig. 5
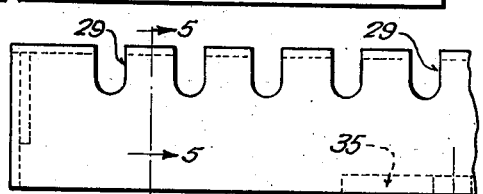
Fig. 6
INVENTOR.
George L. N. Meyer.
BY Eugene H. Simpson
ATTORNEYS.

Nov. 14, 1939. G. L. N. MEYER 2,180,284
CONVEYER
Filed Dec. 9, 1936 3 Sheets-Sheet 3
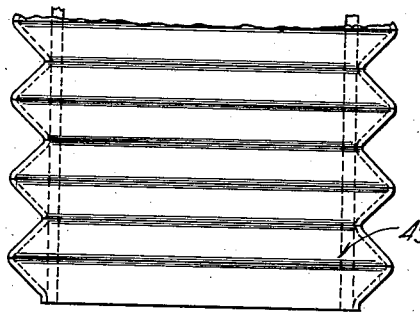
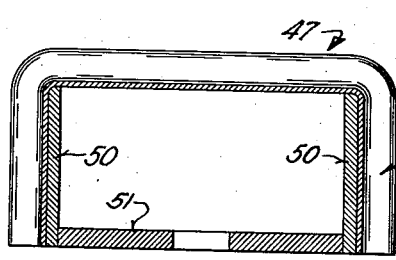
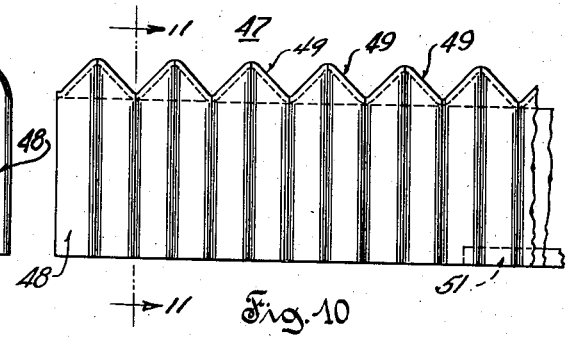
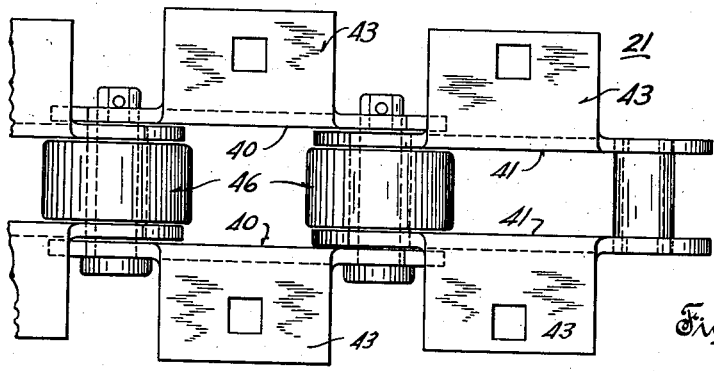
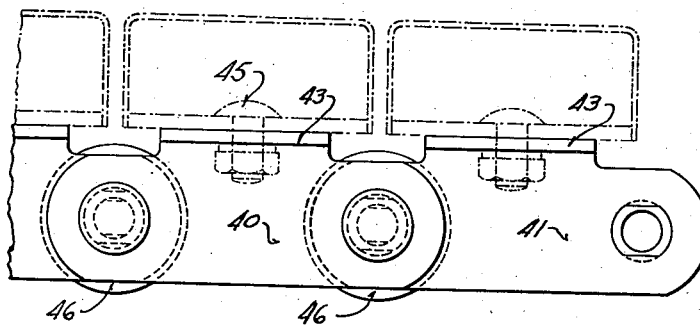

Patented Nov. 14, 1939

2,180,284

UNITED STATES PATENT OFFICE 2,180,284

CONVEYER

George L. N. Meyer, Milwaukee, Wis.

Application December 9, 1936, Serial No. 114,899

16 Claims. (Cl. 198—20)

This invention relates to conveyers and take-off mechanisms.

One object of the present invention is to provide a conveyer plate which will hold and transport a large number of containers of various sizes across the width of the conveyer.

Another object is to provide a conveyer plate which will readily permit the simultaneous discharge of various types of containers throughout the width of the conveyer.

A further object of the invention is to provide a conveyer plate which will be strong and durable.

Another object is to reduce the cost of conveyer plates.

Another object of the invention is to provide a new method of forming conveyer plates.

A further object is to provide a take-off mechanism which will automatically adjust itself to irregularities of the conveyer plates.

A further object is to provide a take-off plate for conveyers which will be light, rigid and simple to manufacture.

Another object is to provide a feed conveyer to receive containers from the take-off plate which will carry both the normal number of containers being discharged and overload discharges.

Other objects will become apparent upon consideration of the following specification, which describes the invention as illustrated in the accompanying drawings.

In the drawings:

Fig. 1 is a plan view of a part of a conveyer embodying the invention;

Fig. 2 is a cross-section on the line 2—2 of Fig. 1;

Fig. 3 is a plan view of the conveyer showing the carrier chains;

Fig. 4 is a view of the conveyer plate before it is formed;

Fig. 5 is a cross-section on the line 5—5 of Fig. 6;

Fig. 6 is a side elevation of the finished conveyer plate;

Fig. 7 is a plan view of the carrier chain;

Fig. 8 is a side elevation of the carrier chain, with the conveyer plates shown in dotted lines;

Fig. 9 is a plan view of a modified form of the conveyer plate;

Fig. 10 is a side elevation of the conveyer plate shown in Fig. 9;

Fig. 11 is a cross-section on the line 11—11 of Fig. 10;

Fig. 12 is a second modified form of conveyer plate, and is a cross-section on the line 12—12 of Fig. 13; and Fig. 13 is a side elevation of the conveyer plate shown in Fig. 12.

Referring to the drawings, in which like numerals designate like parts throughout the several views, and referring particularly to Figs. 1 and 2, conveyer plates 20 are mounted on a plurality of conveyer chains 21, to be described below. The chains 21 ride on tracks 22 which run throughout the length of the machine, and guide the chains to sprocket wheels 23 which drive the conveyer and direct the plates 20 around the wheels 23 to the return flight (not shown).

The conveyer unit is preferably made from a flat sheet or plate 25, shown in Fig. 4, in which elongated apertures 26 are punched. The outer edges of the plate 25 may then be bent along the lines 27 and 28 to a position substantially at right angles to the body of the plate, as shown in Fig. 5. This forms a channel-shaped conveyer plate with slots 29 cut transversely across the tops of the channel, and extending into the adjacent portion of the legs of the channel.

As seen in Figs. 2, 5 and 6, the conveyer units have plates 35 fixed across the open ends of the channel legs which form both a reinforcement for the channel and a means to fasten the channels to the conveyer chains 21.

The chains 21 which are best shown in Figs. 7 and 8 are made with links 40—40 and 41—41 each of which have ears 43 formed thereon which extend outwardly to engage the lower faces of the plates 35. The ears 43 and the plates 35 are fastened together by carriage bolts 45 with suitable lock washers placed under the nuts to prevent the nuts from loosening. The links 40 and 41 are pivoted to each other with wheels 46 mounted at the pivoted joints, as shown.

A second type of conveyer plate 47 which may be used satisfactorily is shown in Figs. 9, 10 and 11. The plate may be formed by corrugating a piece of flat sheet metal and bending down the outer edges 48 to form the legs of a substantially channel-shaped conveyer plate. The corrugations on the top of the plate form slots 49 running transversely across the plate which correspond to the slots 29 of Figs. 5 and 6. Reinforcing plates 50 are fastened to the interior of the legs 48 and complete the legs and form a reinforcing for the plate. The conveyer plates 47 are fastened to the chains 21 through plates 51, formed on the lower end of the legs 48, which correspond to the plates 35 in Figs. 5 and 6.

An alternate form of conveyer unit is shown in Figs. 12 and 13, which comprises a casting 52, having transverse slots 53 across it, which correspond to the slots 29 in Figs. 5 and 6 and to the slots 49 in Figs. 9, 10 and 11. The casting 52 is fixed to a pair of channels 54—54, the channels being affixed to the chains 21 through a plate 55 similar to the plate 35 in Figs. 5 and 6.

Of the three conveyer unit constructions disclosed the type shown in Figs. 4, 5 and 6 is to be preferred due to its economy of construction and ease of manufacture. This type of unit has therefore been shown in Figs. 1, 2 and 3 although it is to be understood that the other types of conveyer units may be employed without departing from the spirit of the invention.

Referring again to Figs. 1 and 2, the take-off mechanism comprises a plurality of flat take-off plates or aprons 60, which have ribs 61 attached to the under side thereof so positioned as to project into the slots 29 of the conveyer units. The ends of the ribs are tapered so as to form fingers 62 the outer ends of which lie below the upper surface of the plates 20. The fingers taper upwardly to the upper surface of the plate 60 to guide the containers being discharged from the conveyer onto the plate 60.

The plates 60 are supported at one end by a bracket 63 on the frame of the machine and the opposite end rides freely on the upper surface of the conveyer units.

Pins 64 fit loosely in holes in the bracket 63 and permit limited pivotal movement of the outer end of the take-off plate 60 and so allows that end to rise or fall slightly to accommodate any irregularities in the elevation of the conveyer. The provision of a plurality of take-off plates or aprons 60 permits the individual plates to adjust themselves to the irregularities of the conveyer plates.

Containers delivered from the conveyer units to the take-off plates 60 are moved across the take-off plates by the pressure of subsequent containers delivered from the conveyer, and pass on to a transverse conveyer 66 which transports the containers to other points on the line. A second transverse conveyer 67 runs parallel to and immediately adjacent the conveyer 66 and receives the surplus containers which the conveyer 66 is unable to accommodate.

A shelf 68 is formed on the outside of the conveyer 67 to receive any containers which may be displaced from the conveyer 67. Containers so displaced are loaded back onto the conveyers 66 or 67 by an attendant stationed at that end of the machine.

Having thus described the invention it is obvious that it is susceptible to various changes and modifications and it is not, therefore, desired to limit the invention to the precise form herein shown and described but only by the scope of the appended claims.

What is claimed as new and desired to secure by Letters Patent is:

1. In a machine of the character described, a frame, a flat conveyer surface comprising a plurality of conveyer plates mounted in said frame each plate having a plurality of slots thereacross, said conveyer being adapted to convey containers through said machine, a take-off plate supported at one end thereof on the frame and supported at the other end on the top of the conveyer and fingers depending from said plate and into said slots to guide containers off the conveyer and onto said plate.

2. In a machine of the character described, a frame, a flat conveyer surface comprising a plurality of conveyer plates, each plate having slots therein running longitudinally of the conveyer, said conveyer being adapted to convey containers through said machine, a take-off plate supported at one end on said frame and supported at the other end on said conveyer, and ribs of less depth than the slots on the lower side of the take-off plate, said ribs fitting in said slots to form guides to direct containers from the conveyer onto the take-off plate.

3. In a machine of the character described, a frame, a flat conveyer surface comprising a plurality of conveyer plates, each plate having a plurality of slots therein running longitudinally of said conveyer, a take-off plate supported at one end on said frame and supported at the other end on said conveyer, ribs formed on the under side of said take-off plate extending into said slots, and fingers on the end of the ribs adjacent the conveyer, said fingers tapering from the top of the plate outwardly to beneath the conveyer surface to direct containers from the conveyer onto the take-off plate.

4. In a device of the character described, a frame, a conveyer mounted in said frame, said conveyer comprising a plurality of substantially channel-shaped members, each member having slots thereacross parallel to the direction of movement of the conveyer, a plurality of take-off plates supported from said frame at one end and on the conveyer at the opposite end, and a plurality of fingers on each of said take-off plates depending into said slots.

5. In a machine of the character described, a frame, a flat conveyer surface comprising a plurality of conveyer plates mounted in said frame, each plate having a plurality of slots thereacross, said conveyer being adapted to convey containers through said machine, a take-off plate pivotally connected at one end thereof to the frame and supported at the other end on the top of the conveyer and fingers depending from said plate and into said slots to guide containers off the conveyer and onto said plate.

6. In a machine of the character described, a frame, a flat conveyer surface comprising a plurality of conveyer plates, each plate having slots therein running longitudinally of the conveyer, said conveyer being adapted to convey containers through said machine, a take-off plate pivotally connected at one end thereof to said frame and supported at the other end on said conveyer, and ribs of less depth than the slots on the lower side of the take-off plate, said ribs fitting in said slots to form guides to direct containers from the conveyer onto the take-off plate.

7. In a machine of the character described a frame, a flat conveyer surface comprising a plurality of conveyer plates, each plate having a plurality of slots therein running longitudinally of said conveyer, a take-off plate pivotally connected at one end thereof to said frame and supported at the other end on said conveyer, ribs formed on the under side of said take-off plate extending into said slots, and fingers on the end of the ribs adjacent the conveyer, said fingers tapering from the top of the plate outwardly to beneath the conveyer surface to direct containers from the conveyer onto the take-off plate.

8. In a device of the character described, a frame, a conveyer mounted in said frame, said conveyer comprising a plurality of substantially channel-shaped members, each member having slots thereacross parallel to the direction of movement of the conveyer, a plurality of take-off plates pivotally connected at one end thereof to said frame and supported on the conveyer at the opposite end, and a plurality of fingers on each of said take-off plates depending into said slots.

9. In a device of the character described, a frame having a plurality of apertures therein, a conveyer mounted in said frame, a take-off plate supported between the frame and the conveyer, and pins on said take-off plate engageable with said apertures to form a pivotal connection between the take-off plate and the frame.

10. In a pasteurizer of the character described, a frame having a plurality of apertures therein, a conveyer mounted in said frame and adapted to carry containers through said pasteurizer, a plurality of take-off plates supported between said frame and said conveyer, and a plurality of pins on each of said take-off plates engageable in said apertures to form a pivotal connection between the take-off plate and the frame.

11. In a device of the character described, a frame, a conveyer mounted to travel longitudinally through said frame, a second conveyer mounted in said frame and moving transversely thereto, a third conveyer mounted in said frame and parallel to said second conveyer, and a plurality of perforated take-off plates supported between the frame and said first named conveyer and adapted to receive containers from said first conveyer and deliver them onto said second and third conveyers.

12. A machine of the character described comprising, a frame, a flat conveyer surface comprising a plurality of conveyer plates, each plate having slots therein running longitudinally of the conveyer, said conveyer being adapted to convey containers through said machine, a plurality of take-off plates extending across the width of said conveyer, and ribs, of less depth than the said slots, formed on the lower side of each of the take-off plates, said ribs fitting within said slots to form guides to direct containers from the conveyer onto the take-off plates.

13. In a device of the character described, a frame, a conveyer mounted to travel longitudinally in said frame, said conveyer having a plurality of slots therein extending longitudinally of said frame, a second conveyer spaced from said first conveyer and movable transversely thereto, a plurality of perforated take-off plates supported between the conveyers, a plurality of fingers formed on each take-off plate on the end thereof adjacent said first conveyer, said fingers extending into said slots and maintained above the bottom of said slots, said take-off plates and said fingers receiving containers from said first conveyer and delivering the same to said second conveyer.

14. In a device of the character described, a frame, a conveyer mounted to travel longitudinally in said frame, said conveyer having a plurality of slots therein extending longitudinally of said frame, a second conveyer spaced from said first conveyer and movable transversely thereto, a plurality of take-off plates supported between the conveyers, a plurality of fingers formed on each take-off plate on the end thereof adjacent said first conveyer, said fingers extending into said slots and maintained above the bottom of said slots, said take-off plates and said fingers receiving containers from said first conveyer and delivering the same to said second conveyer.

15. A device of the character described comprising, a frame, a conveyer mounted in said frame, and movable longitudinally therethrough, said conveyer comprising a plurality of inverted channel-shaped members each member having a plurality of slots thereacross parallel to the direction of movement of said conveyer, a plurality of take-off plates supported from said frame, and a plurality of fingers formed on each of said take-off plates on the end thereof adjacent said conveyer, said fingers extending into and lying above the bottoms of said slots to receive containers from said conveyer and deliver the same onto said take-off plate.

16. A device of the character described comprising, a frame, a conveyer mounted in said frame, and movable longitudinally therethrough, said conveyer comprising a plurality of inverted channel-shaped members each member having a plurality of slots thereacross parallel to the direction of movement of said conveyer, a plurality of take-off plates supported from said frame, and a plurality of fingers formed on each of said take-off plates on the end thereof adjacent said conveyer, the top surface of said fingers extending below the tops of said grooves and the lowest point on said fingers being maintained above the bottoms of the grooves.

GEORGE L. N. MEYER.